(12) United States Patent
Eaton

(10) Patent No.: US 12,036,527 B1
(45) Date of Patent: Jul. 16, 2024

(54) SYSTEM AND METHOD FOR PRODUCING ULTRA-HIGH MOLECULAR WEIGHT POLYALPHAOLEFINS FOR USE AS PIPELINE DRAG REDUCING AGENTS

(71) Applicant: Gerald B. Eaton, Las Vegas, NV (US)

(72) Inventor: Gerald B. Eaton, Las Vegas, NV (US)

( * ) Notice: Subject to any disclaimer, the term of this patent is extended or adjusted under 35 U.S.C. 154(b) by 0 days.

(21) Appl. No.: 18/565,010

(22) PCT Filed: May 31, 2022

(86) PCT No.: PCT/US2022/031604
§ 371 (c)(1),
(2) Date: Nov. 28, 2023

(87) PCT Pub. No.: WO2022/251737
PCT Pub. Date: Dec. 1, 2022

Related U.S. Application Data

(60) Provisional application No. 63/194,622, filed on May 28, 2021.

(51) Int. Cl.
*B01J 19/24* (2006.01)
*B01J 8/00* (2006.01)
*B01J 8/18* (2006.01)

(52) U.S. Cl.
CPC ............ *B01J 19/249* (2013.01); *B01J 8/001* (2013.01); *B01J 8/18* (2013.01); *B01J 19/2445* (2013.01); *B01J 19/245* (2013.01); *B01J 2208/00168* (2013.01); *B01J 2219/2453* (2013.01); *B01J 2219/2456* (2013.01); *B01J 2219/2462* (2013.01)

(58) Field of Classification Search
CPC .... B01J 19/249; B01J 19/245; B01J 19/2445; B01J 8/001; B01J 8/18; B01J 2219/2453; B01J 2219/2458; B01J 2219/2462; B01J 2208/00168
See application file for complete search history.

(56) References Cited

U.S. PATENT DOCUMENTS

| | | |
|---|---|---|
| 6,582,667 B1 | 6/2003 | Ogata et al. |
| 6,992,152 B2 | 1/2006 | Lobue et al. |
| 2004/0167300 A1* | 8/2004 | Kommareddi ........ C08F 210/14 422/138 |

(Continued)

*Primary Examiner* — Lessanework Seifu
(74) *Attorney, Agent, or Firm* — McCutcheon Joseph, PLLC

(57) ABSTRACT

A system is disclosed for producing ultra-high-molecular-weight (UHMW) poly-alpha-olefins (PAO) for use as pipeline drag reducing agents, having improved thermal efficiency and reduced branching of the PAO. The system comprises hinged pairs of shells, each pair of shells comprising a grid of larger hemispherical voids connected by smaller hemicylindrical passages, arranged in a serpentine pattern along the surface area of the shell. When the hinged pairs of shells are shut, they form a pattern of spherical voids which can be connected to an inlet port, which receives a combination of alpha-olefin monomer feedstock and a titanium trichloride catalyst. A reactor chamber houses a plurality of these hinged pairs of shells, which may slide into slots inside the reactor chamber spaced such that each adjacent hinged pair of shells abuts the outer surface of the next when shut and inserted. The reactor chamber is cooled by an inert gas.

10 Claims, 7 Drawing Sheets

(56) References Cited

U.S. PATENT DOCUMENTS

| | | |
|---|---|---|
| 2018/0207608 A1 | 7/2018 | Yeh et al. |
| 2018/0236428 A1 | 8/2018 | Ritter |
| 2018/0272309 A1 | 9/2018 | Bhandarkar et al. |
| 2019/0201862 A1 | 7/2019 | DeCourcy et al. |

\* cited by examiner

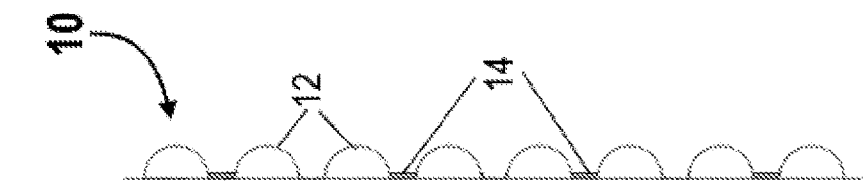
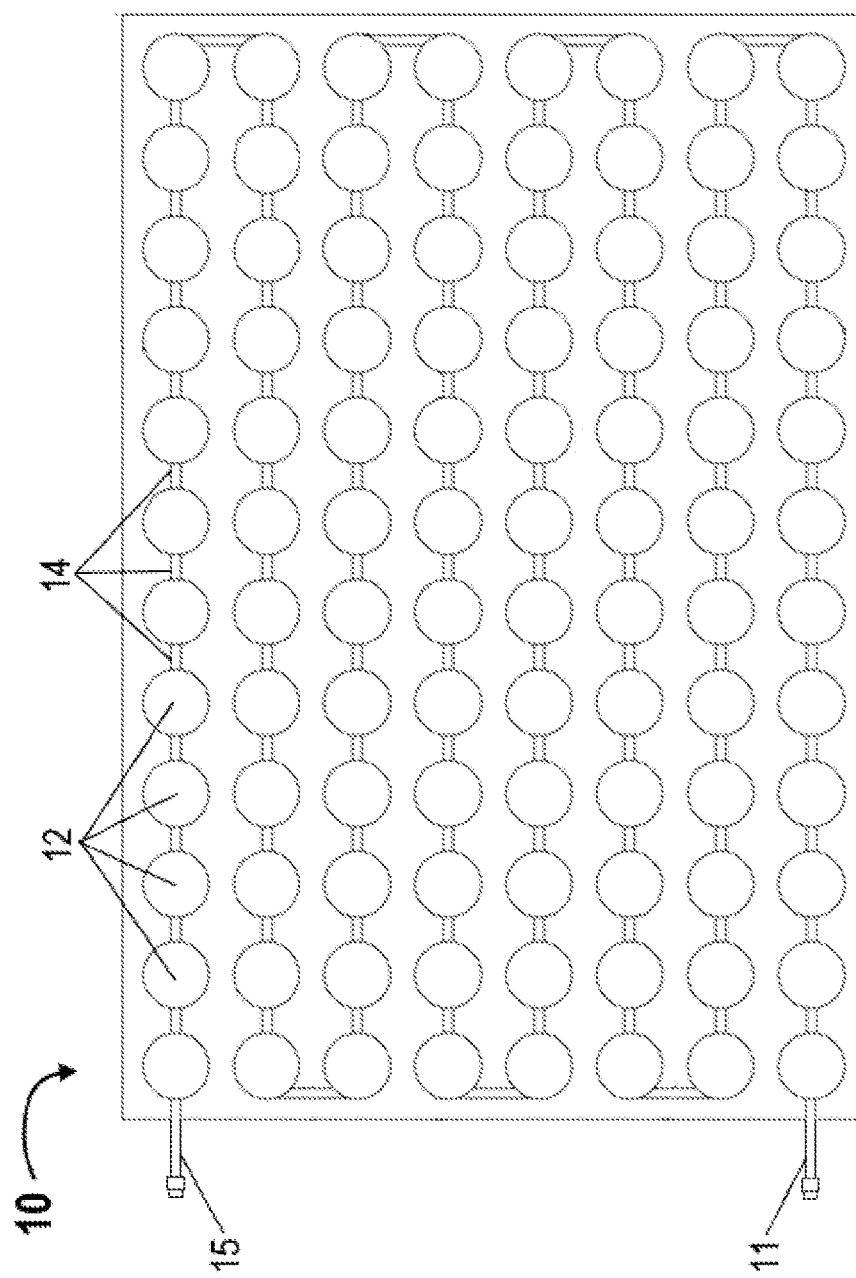
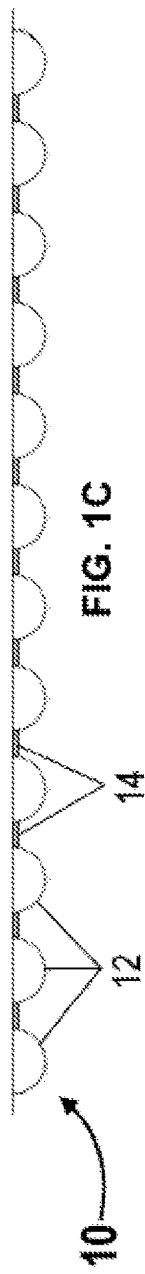

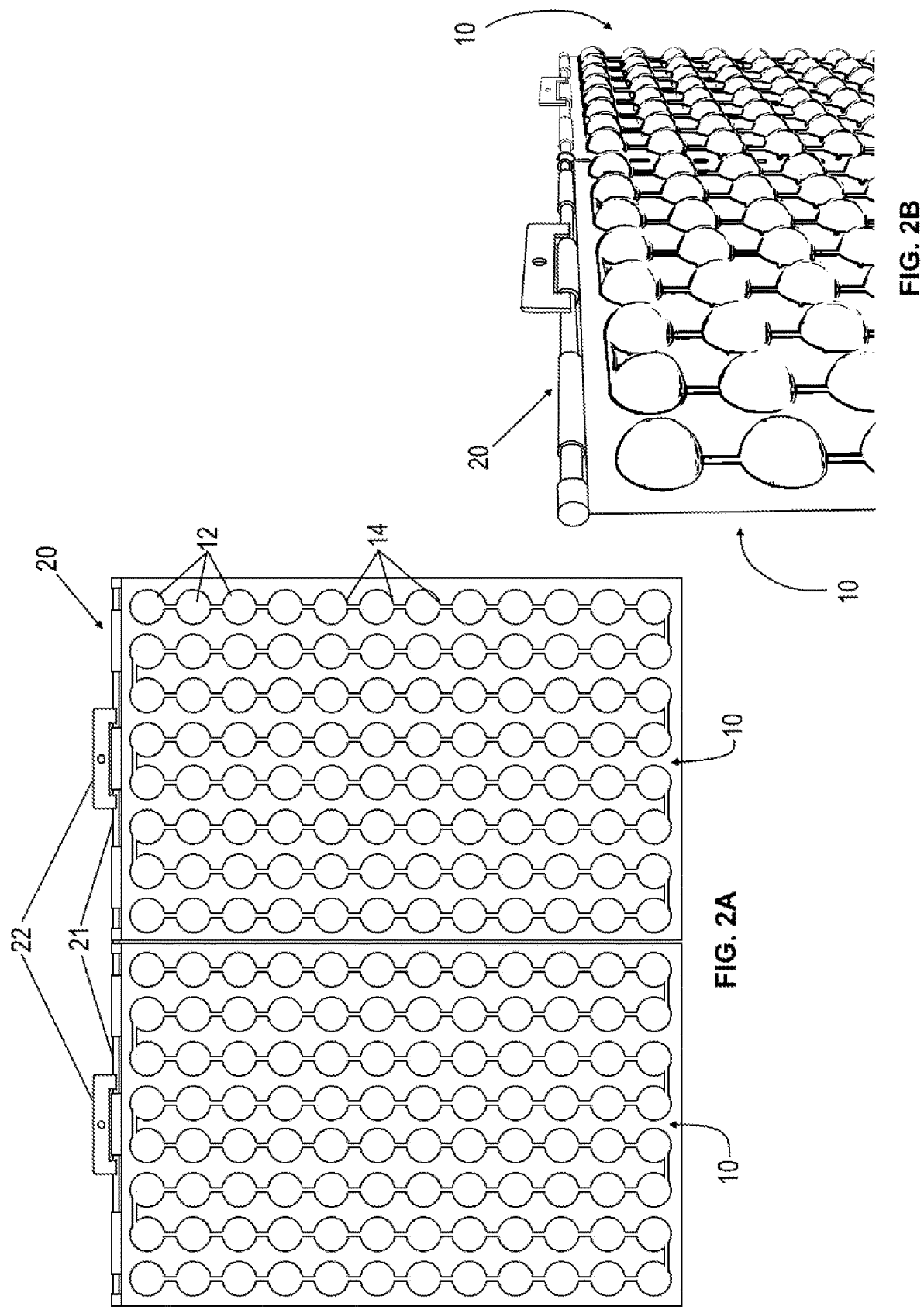

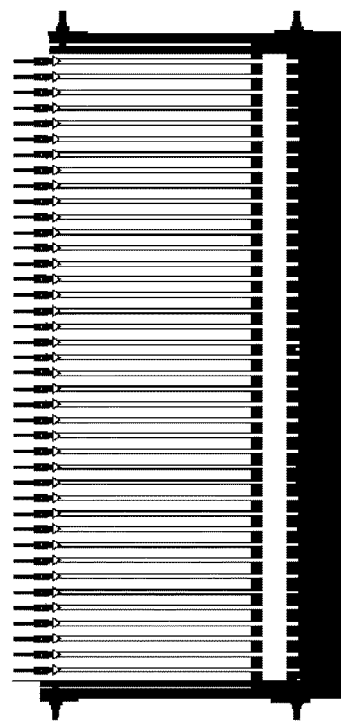
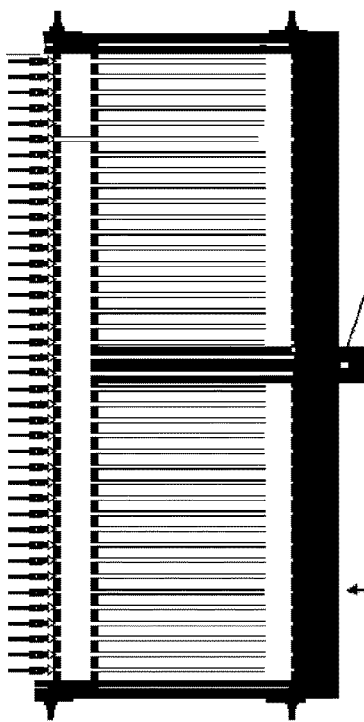
FIG. 7A
FIG. 7B
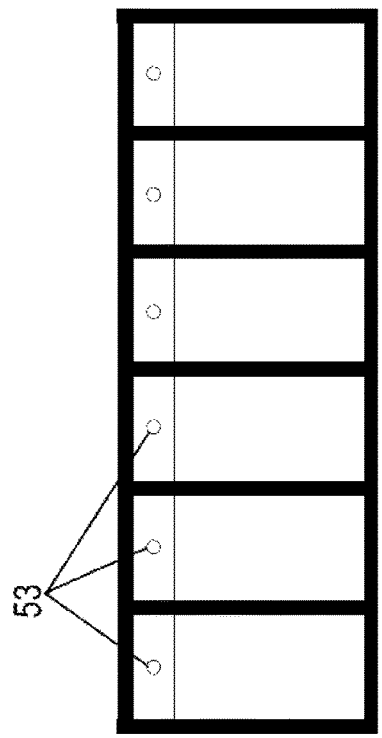
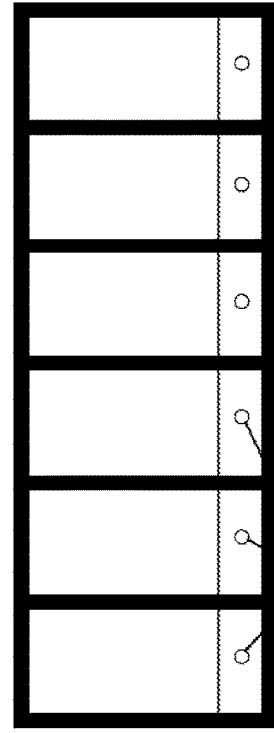
FIG. 6A
FIG. 6B

SYSTEM AND METHOD FOR PRODUCING ULTRA-HIGH MOLECULAR WEIGHT POLYALPHAOLEFINS FOR USE AS PIPELINE DRAG REDUCING AGENTS

REFERENCE TO RELATED APPLICATIONS

This is a US patent application claiming priority to PCT Application No. PCT/US/2022/031604, filed 31 May 2022, having the same title and inventor, which in turn claims priority to U.S. Provisional Patent Ser. No. 63/194,622, filed 28 May 2021, having the same title and inventor. The contents of the above-referenced applications are incorporated by reference.

FIELD

This invention relates to methods for forming substantially non-crystalline, amorphous ultra-high molecular weight poly alpha-olefins which can then be used as a drag reducing agent for improving flow volumes of hydrocarbons liquids flowing through a conduit, particularly through liquid petroleum pipelines.

BACKGROUND

Drag reducing agents (DRAs) are commonly used in the oil and gas industry as additives to increase flow-rate of hydrocarbons through pipelines and conduits where the hydrocarbons may be in turbulent flow. The most common types of DRAs utilized in the industry are ultra-high molecular weight (UHMW) polymers, or polymers with a molecular weight of at least 12 mM, and most commonly poly-alpha-olefin (POA). The UHMW polymer(s) constitute the internal phase of a typical DRA formulation, and are combined with and suspended with the external phase of the formulation, a solution of water and other organic and inorganic components and/or various types of vegetable oils and other stabilizing agents to create the desired slurry for use as a finished DRA product within a petroleum pipeline system.

However, while the formation of highly linear long-chain polymers evolving from the monomer feedstock is well-known and preferred in the practice of this art, there are inherent limitations to scaling this preferred linear polymerization process. These limitations are largely due the presence of other unwanted internal olefins and vinylidenes within commercial alpha olefin monomers. These impurities can and do create unwanted branching and weakening of the preferred linear alpha olefin monomer "backbone" structures during the polymerization process.

Other known processing practices also promote this undesirable branching. These practices include allowing the temperature of polymerizing alpha olefin monomer(s) to rise above preferred reaction temperatures. These elevated temperatures occur and are generally located at or near the core zone of the polymerizing alpha olefin monomer within the reactor, or conversely, at the greatest distance from the reactor's cooling source. Existing POA reactors construction and geometric layouts are often governed by practical considerations in construction and ignore or are unaware of the consequences of effective heat control within this core zone. Present production practices, in which heat control of the core zone is not effectively addressed or controlled, result in a larger mass body within this core zone of lower and less desirable and less functional UHMW POA product.

A need therefore exists for a superior UHMW POA addressing the shortfalls in current production practices. These include better and more efficient heat transfer and control requirements within the polymerization reactor based exclusively on dimensional considerations, which enhances and provides for lower levels of undesirable monomer-to-polymer branching common with existing UHMW POA reactor production practices.

A need therefore exists for a reactor capable of producing large quantities of ultra-high molecular weight polymers by accommodating and promoting better core zone heat control, resulting in better overall superior PAO yields, and which is easy to operate and maximizes the efficiency of the cooling applied to the reaction space.

Embodiments described within the present disclosure meet these needs.

SUMMARY

An embodiment of a polymerization reactor comprises a plurality of spherical voids approximately eight inches in diameter which are formed by the hinged abutment of two reactor shells, each reactor shell comprising a plurality of hemispherical voids, and a small conduit space connecting each spherical void to another. The spherical voids and the conduits connecting them are arranged in a serpentine pattern with one spherical void being connected to an entry port and one spherical void connected to an exit port. When the reactor shells are secured to each other, the entry port permits the pressurized transfer of alpha-olefin monomers and a heterogeneous catalyst which may comprise titanium trichloride and other additives and/or co-catalysts.

To further enhance production, pairs of reactor shells can be further arranged in a containment vessel to enhance cooling. The containment vessel may comprise a cubic space with a plurality of slots on each side of the vessel, and the bottom of the vessel, enabling the paired reactor shells to slide into a corresponding slot within the containment vessel. In an embodiment, the slots may be spaced so that the outermost diameter of each pair of reactor shells abuts the outermost diameter of the adjacent pair of reactor shells such that the shells are physically in contact. Once filled, the containment vessel may be filled with a coolant gas which may, in an embodiment, comprise atmospheric air containing oxygen and possessing a dew point greater than 45° F.

BRIEF DESCRIPTION OF THE DRAWINGS

FIGS. 1A-1C depict front, top, and side views of an embodiment of a reactor shell as utilized with the present invention.

FIGS. 2A-2B depict a front and perspective view of reactor shells mounted to a hinge assembly for use with the present invention.

FIGS. 6A-6B and 7A-7B depict two alternative embodiments of cooling vessels for use with the present invention.

Figure 3:
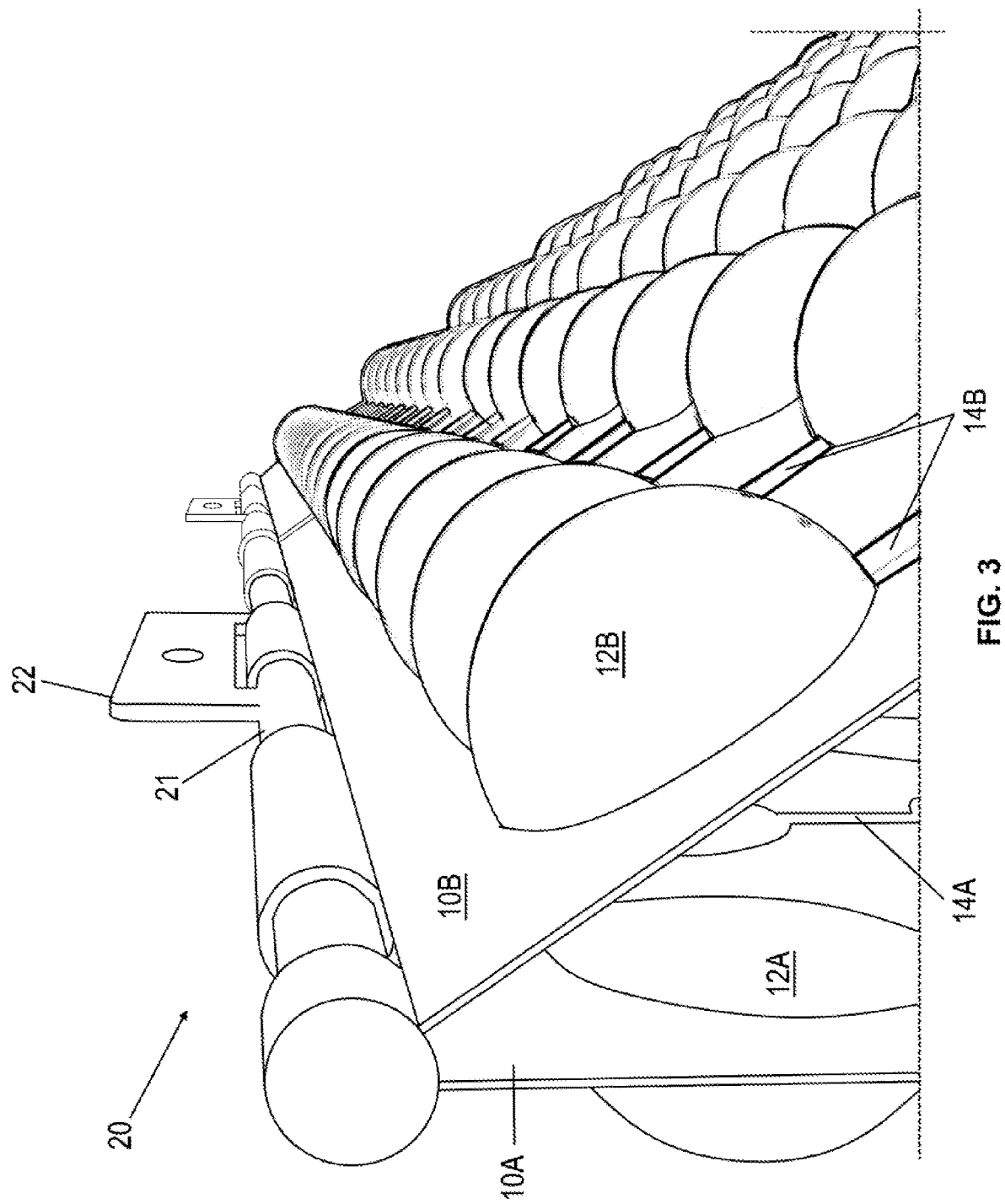
FIG. 3 depicts a perspective view of duplexed reactor shells forming the plurality of reaction chambers for use with the present invention.

The detailed embodiments are described below with respect to one or more of the above-listed figures.

DETAILED DESCRIPTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Turning first to FIG. 1A-1C, an embodiment of a reactor shell 10 is shown in front, side, and top views. Each reactor shell 10 comprises a shell of metal, composite, or a suitable plastic sheet stock with a series of hemispherical voids 12 which are stamped into the shell. In an embodiment, these hemispherical voids 12 may comprise a radius of four inches from the plane of the shell. In addition, each hemispherical void 12 is connected to an adjacent hemispherical void 12 by means of a smaller conduit 14, which may be any suitable size smaller than the hemispherical voids 12. Two hemispherical voids 12 on the top side of the reactor shell connect to an inlet port 11 and an outlet port 13, respectively.

The inlet port 11, voids 12, conduits 14, and outlet port 15 are arranged in a single serpentine pattern along the reactor shell 10 so that when monomer is fed through the inlet port 11 at a given pressure, it will fill all voids at a predictable rate.

Turning now to FIGS. 2A-2B, two reactor shells 10 are shown adjacent to each other having the voids 12 and conduits 14 as in FIG. 1. (The inlet/outlet ports are omitted from this drawing for clarity). FIGS. 2A-2B also show the hinge mechanism 20 with a crossbar 21 and a handle extension 22 which enables easy handling of the reactor shells 10. It should be noted that while the embodiment in FIG. 2 shows two reactor shells 10 along a single crossbar 21, other embodiments may comprise a single shell or more than two shells, as dictated by ease of use.

Turning now to FIG. 3, two reactor shells 10A and 10B are shown in the foreground along the same line of sight as FIG. 2B. Reactor shells 10A and 10B are individually identical to each other (and to the reactor shells 10 depicted in FIGS. 1-2) with the exception that one of reactor shell 10A or 10B is flipped. When joined, the respective voids 12 and conduits 14 of reactor shells 10A and 10B form a duplex reactor shell comprising a plurality of fully spherical reaction chambers, which in an embodiment may have a diameter of eight inches (double the four-inch radius of the hemispherical voids of the individual shells.) Although they are not numbered for clarity, the shells in the background of FIG. 3 are similarly doubled to form a similar series of voids (i.e., reaction chambers) and conduits.

Figure 4:
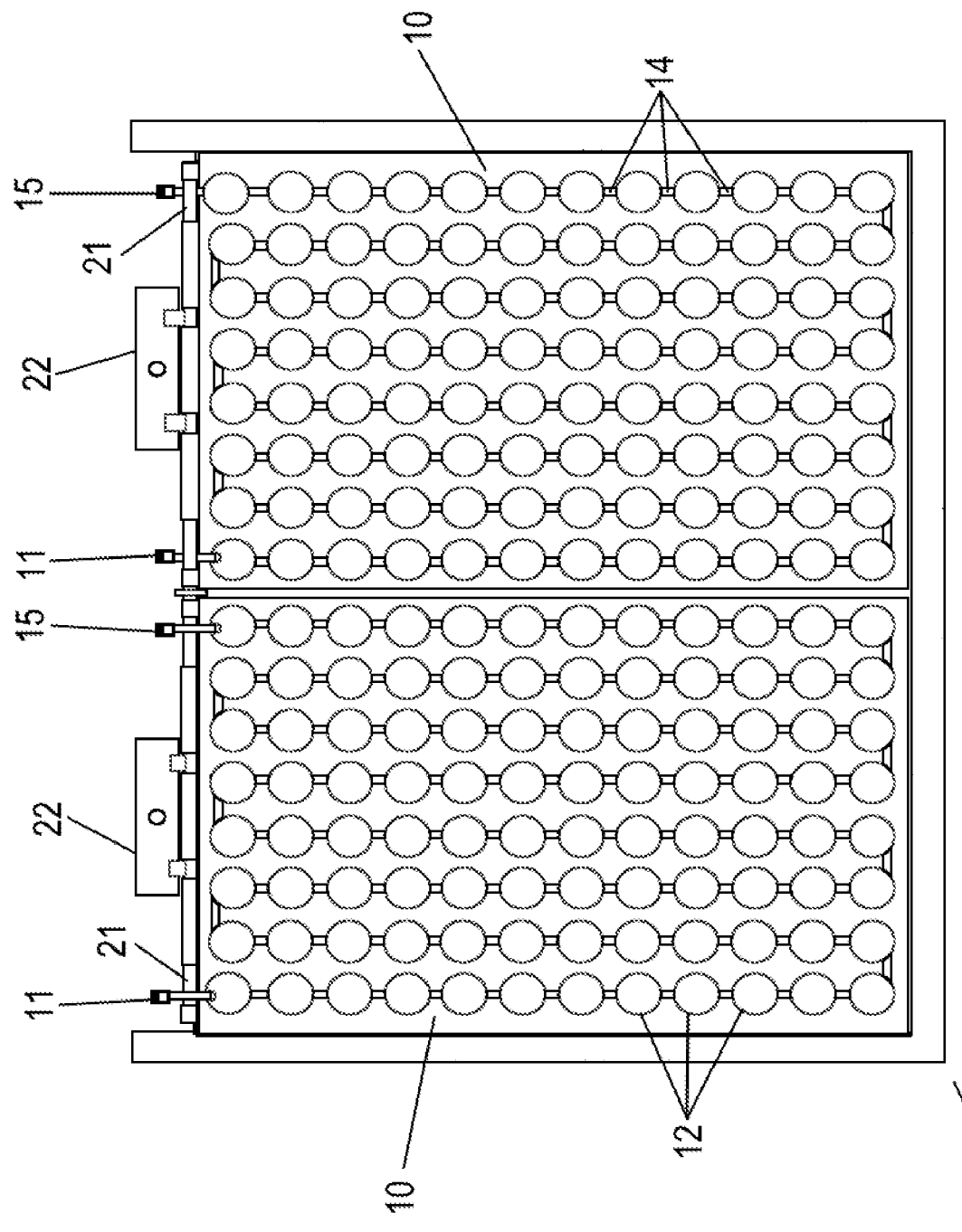
FIG. 4 depicts a cross-section view of a duplexed reactor shell mounted to a hinge assembly within a cooling vessel for use with the present invention.

Turning now to FIG. 4, two duplex reactor shells 10 are shown on a hinge bar 21 with hinge handle 22 within a cooling vessel 50. Each duplex reactor shell 10 comprises an inlet port 11 and an outlet port 15 for receiving pressurized monomer and catalyst feedstock. As with prior figures, two duplex reactor shells 10 are shown merely by way of example; other embodiments may have one double-wide duplex reactor shell (each made up of single reactor shells in opposing orientation as in FIG. 3) or more than two. In addition, while the duplex reactor shells 10 are shown here having inlet ports 11 and outlet ports 15 connectable to individual monomer feeds, other embodiments may comprise, e.g., a manifold arranged along the cooling vessel 50 to permit simultaneous pressurization of multiple duplex reactor shells from a single valve.

Figures 5, 5A:
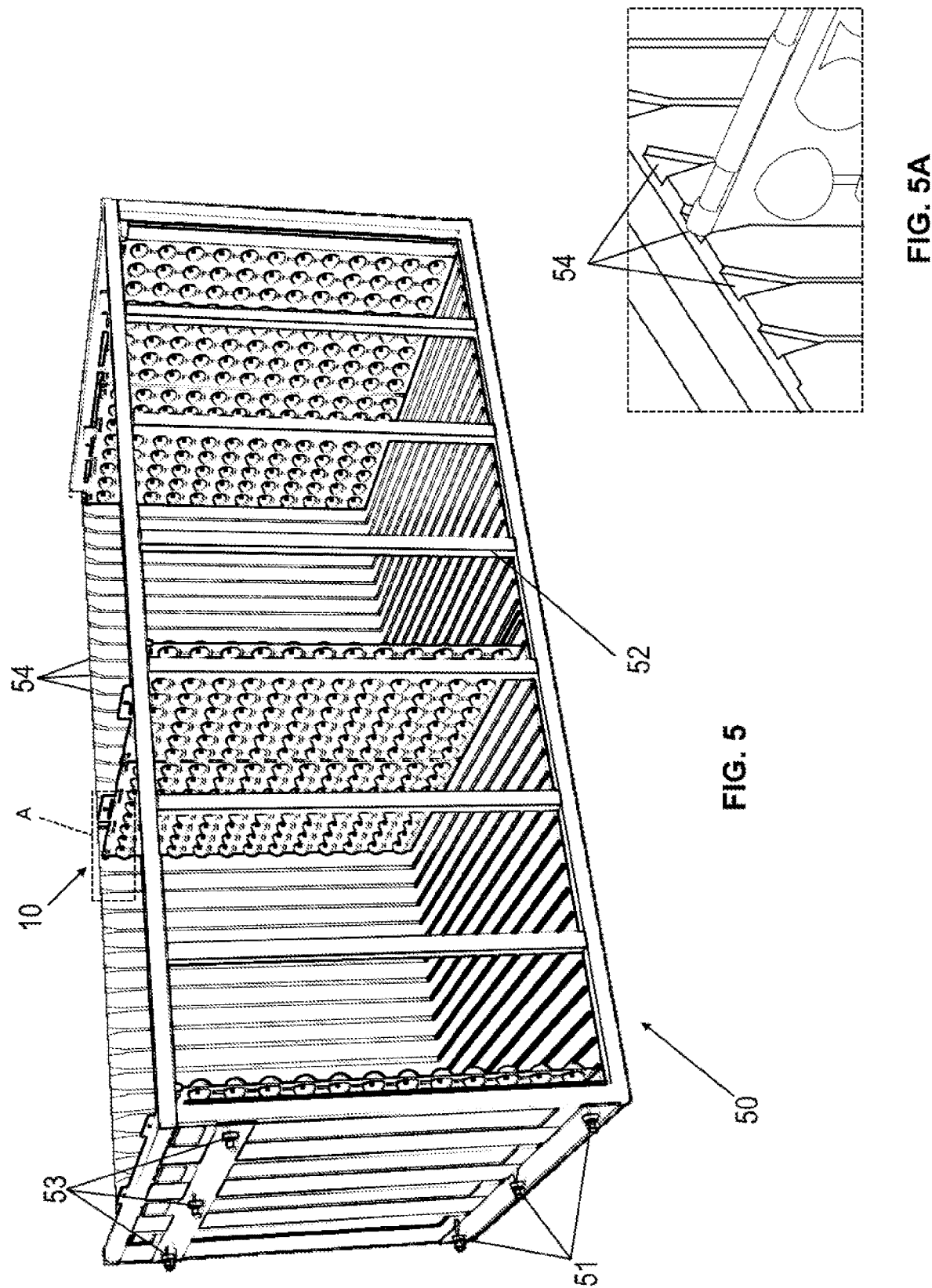
FIG. 5 depicts a perspective view of a cooling vessel with one duplexed reactor shell inserted therein.
FIG. 5A depicts a close-up view of box A in FIG. 5.

Turning now to FIG. 5, the cooling vessel 50 is shown in greater detail. Cooling vessel 50 comprises a plurality of inlet ports 51 and outlet ports 53 for receiving a chilled gas from a source. Cooling vessel 50 also comprises a plurality of spacing bars 52 and a plurality of slots 54 on the lateral walls of cooling vessel 50 and the floor of cooling vessel 50. These slots 54 have flared widths at the top (shown in detail view in FIG. 5A) to enable the easy insertion and removal of duplex reactor shells 10 via the handles 22 of the hinge mechanism (as shown in FIGS. 2-4). The inlet ports 51 and outlet ports 53 may convey coolant into the vessel 50 and, once warmed, back out of the vessel 50. In an embodiment, a refrigerator (not shown) forms a closed loop ensuring the coolant does not escape and any conditioning of the cooling gas (e.g., humidity level, additives to raise flash point) is maintained.

FIGS. 6A-6B and 7A-7B depict two possible alternative configurations of the cooling vessel 50. FIGS. 6A and 6B feature multiple coolant inlet and outlet ports on the long side of the cooling vessel 50 rather than the short side as depicted in FIG. 5. FIGS. 7A and 7B depict coolant inlets and outlets on the bottom of the cooling vessel 50, with the warm air outlet 53 at the center of the vessel 50 and multiple cool air inlets 51 on either side of the center.

It has been discovered that the configuration described and depicted above is optimal for producing UHMW polymers having molecular weights greater than 12 mM. The polymers are produced from the polymerization of alpha-olefin monomers containing repeating carbon atoms from 3 to 16, combined with a heterogeneous catalyst formulation containing titanium trichloride. The configuration of multiple spherical reaction chambers in close proximity also enhances the cooling efficiency. In a preferred embodiment, the radius dimension between the center point of the spherical void to the inner surface of the duplexed reactor shell is between 1.5 inches to 4 inches from the center point to the inner surface of the duplexed reactor shell.

It can be appreciated that the length and width of the reactor shells can be varied depending on how many reaction chambers it is desired to assemble; embodiments may range from a 6-inch square plane to a 120-inch square plane, or a rectangular plane. The reactor shells may be formed of metal, composite, or a suitable plastic and be anywhere from 0.1 inches to 3.0 inches thick. In an embodiment, the interior hemispherical cavities of each individual reactor shell may be coated with a heat setting powder to effect release of the polymer from the cavities without the need of a liner or other membrane.

Figure 8:
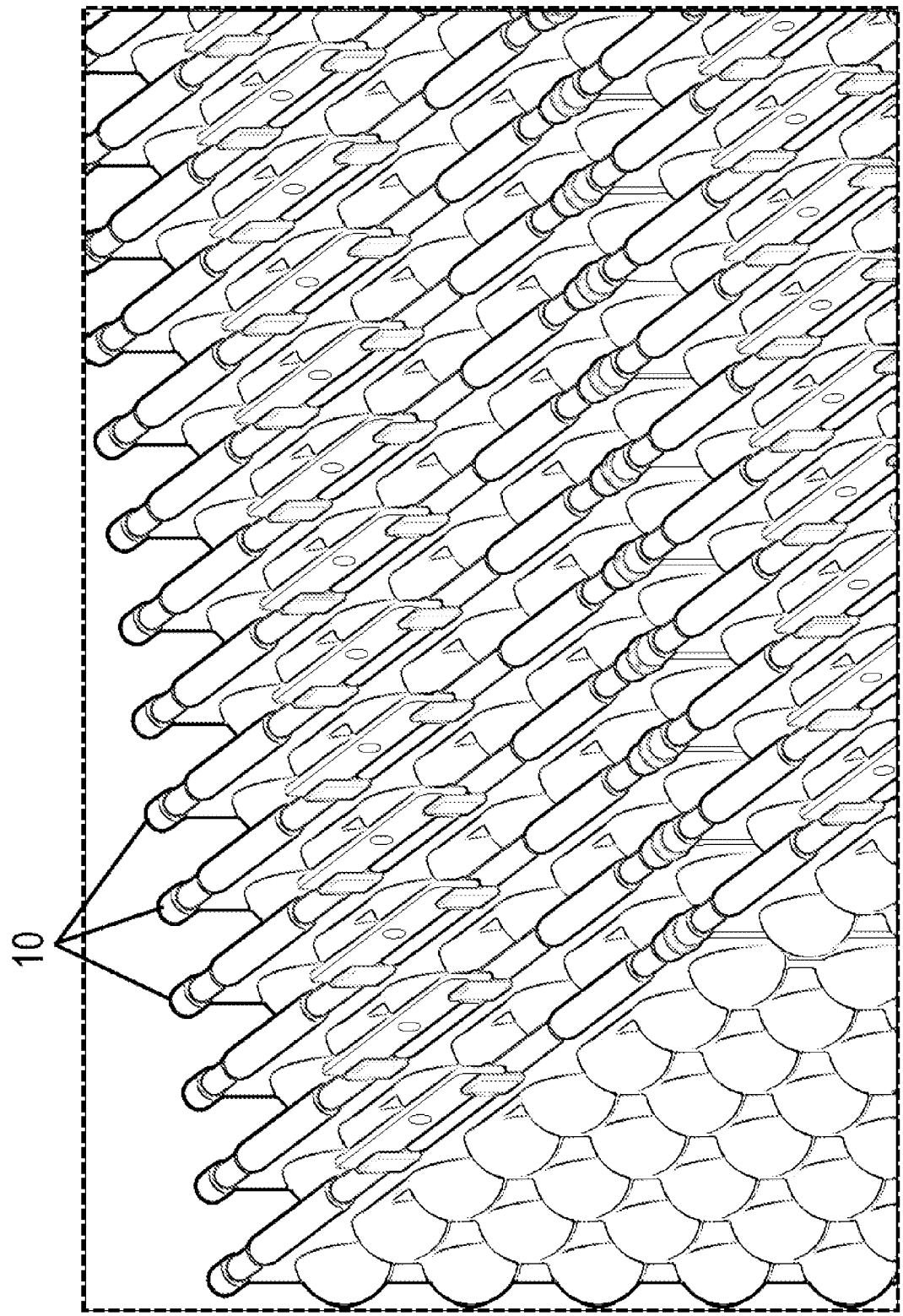
FIG. 8 depicts a perspective view of multiple duplexed reactor shells as spaced within a cooling vessel, but with the cooling vessel omitted for clarity, for use with the present invention.

In an embodiment, each duplexed reactor shell is formed and spaced within the cooling chamber such that adjacent duplexed reactor shells are directly in contact with one another (e.g., each duplexed reactor shell and corresponding slot in the cooling chamber are placed apart at intervals equal to the diameter of the spherical voids, plus the thickness of the shells themselves). FIG. 8 depicts this spacing between several reactor shells 10 as it would appear within the cooling vessel (with the vessel itself omitted for clarity). This precise spacing serves several functions: it minimizes the space between the duplexed reactor shells and thus the amount of cooling gas necessary, and the consistency of spacing ensures that the gas cools all individual reaction chambers as evenly as possible. It also aids in keeping the structure stable and free of leaks as the individual reactor shells are unable to flex open when under pressure. In effect, the adjacency of each duplexed reactor shell, along with the slots of the cooling chamber, effects a seal between the two individual reactor shells of each duplexed reactor shell, preventing them from swinging open even when being fed pressurized monomer feedstock.

In an embodiment, the reactor shells 10 may be sprayed down with vegetable or mineral oils to enhance the release of the polymerized polymer from the voids 12 after the polymerization reaction. This may comprise, e.g., a brush, spray, or atomized application within an inert gas purge with nitrogen and/or carbon dioxide prior to filling the reactor with the alpha-olefin monomer feedstock.

In an embodiment, the cooling chamber may be cooled by atmospheric air containing oxygen and possessing a dew point no higher than 45° F. This atmospheric air inlet temperature into the shell structure will be controlled between 51° F. to 75° F. to effectuate the proper process temperature control of the catalyzed monomer reaction rate and temperature within the reaction chambers. Additionally, the atmospheric air may also contain a minority volume of other inert gases such as nitrogen or carbon dioxide or other inert gases. Their purpose would include to raise flash point temperatures of the mass gas volume and/or to further lower the dew point values of full mass gas volume contained within the cooling chamber.

In another embodiment, the cooling vessel may be part of a closed-conduit duct pipe network system, in which the coolant gas may be monitored and controlled via the inlets and outlets of the coolant chamber as necessary to maintain proper reaction temperatures of the catalyzed alpha-olefin monomers contained within the reaction chambers within the cooling vessel. In an embodiment, the design gas flow volume requirements could be regulated from a minimum gas flow of 5 cubic feet per minute per individual duplexed plate reactor assembly contained within a shell structure to a maximum gas flow of 100 cfm per individual duplexed reactor plate assembly.

In another embodiment, the closed-conduit duct pipe network system may permit collection and recovery of coolant gas exiting the cooling vessel containing the duplexed reactor plates. The exhaust gas would be transported through a refrigeration chiller/exchanger bundle after exiting the gas exhaust and reconditioned to a predetermined adjustable set-point (e.g., temperature, humidity, or a particular level of supplemental gas as needed to raise the flash point) and then returned to the cooling vessel via the gas inlet.

While various embodiments usable within the scope of the present disclosure have been described with emphasis, it should be understood by persons of ordinary skill in the art that other obvious variations exist that other variations claims, and the present invention can be practiced other than as specifically described herein.

The invention claimed is:

1. A system for producing ultra-high molecular weight polymers comprising:
   a duplexed reactor shell comprising two reactor shells, each reactor shell comprising a plurality of hemispherical voids, the plurality of hemispherical voids connected by a plurality of conduits, such that when one reactor shell is fitted to another reactor shell to form the duplexed reactor shell, the plurality of hemispherical voids align to form a plurality of spherical reaction chambers connected by the plurality of conduits;
   a monomer inlet port connected to at least one spherical reaction chamber of the plurality of spherical reaction chambers, and a polymer outlet port connected to at least another spherical reaction chamber of the plurality of spherical reaction chambers, wherein the inlet ports convey a pressurized mixture of alpha-olefin monomer and catalyst into the plurality of spherical reaction chambers through the plurality of conduits to undergo polymerization; and
   a cooling vessel comprising at least one slot, wherein the slot receives the duplexed reactor shell and prevents the individual reactor shells from separating under pressure, wherein the cooling vessel contains a cooling fluid.

2. The system of claim 1, further comprising a plurality of duplexed reactor shells, and wherein the cooling vessel comprises a plurality of slots corresponding with the plurality of duplexed reactor shells.

3. The system of claim 2, wherein each slot is spaced at an interval equal to the radius of each spherical reaction chamber, such that each duplexed reactor shell abuts an adjacent duplexed reactor shell when fitted to the respective slots of the cooling vessel.

4. The system of claim 1, wherein the cooling vessel further comprises a coolant inlet port and a coolant outlet port.

5. The system of claim 4, wherein the coolant inlet port and coolant outlet port form a closed-loop refrigeration system enabling recycling of coolant fluid.

6. The system of claim 5, wherein the coolant fluid comprises atmospheric gas at a dew point no higher than 45° F.

7. The system of claim 1, wherein the catalyst is titanium trichloride.

8. The system of claim 1, wherein the reactor shells are joined into duplexed reactor shells by means of a hinge connecting the tops of the reactor shells.

9. The system of claim 1, wherein the radius of each reaction chamber is between 1.5 and 4 inches.

10. The system of claim 1, wherein the plurality of hemispherical voids within each duplexed reactor shell are coated with a mineral or vegetable oil prior to the conveyance of the pressurized mixture of alpha-olefin monomer and catalyst.

\* \* \* \* \*